Figure 4:
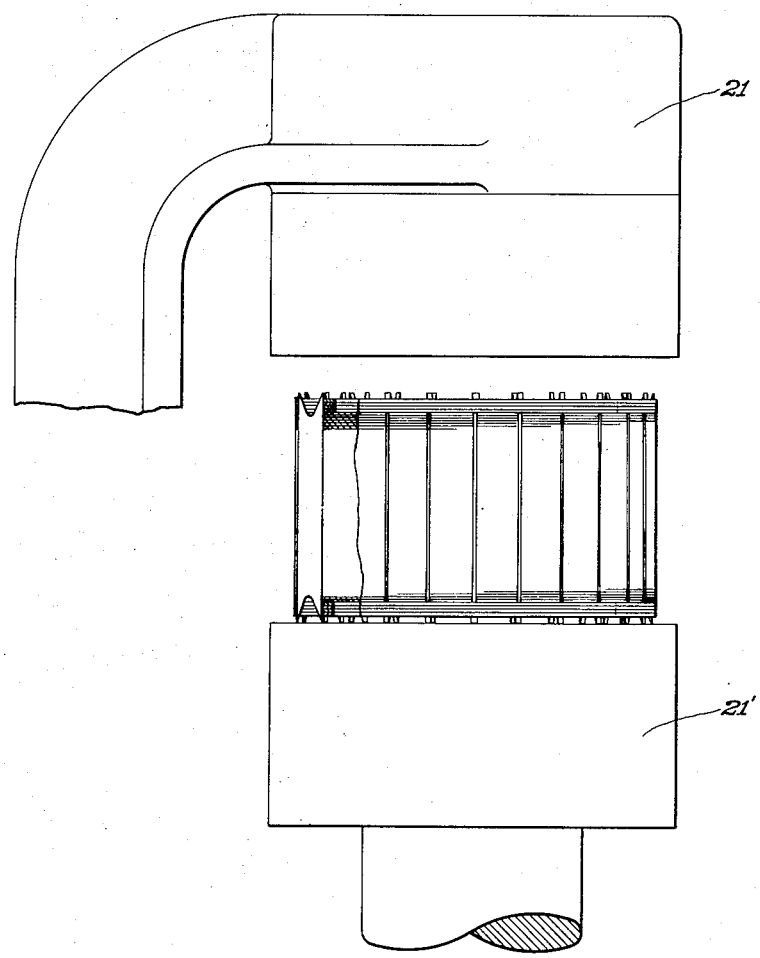

Nov. 21, 1933.                C. O. BERGSTROM                1,936,244
             LAMINATED CORE MEMBER AND METHOD OF MAKING THE SAME
                      Filed Feb. 11, 1927          2 Sheets-Sheet 1
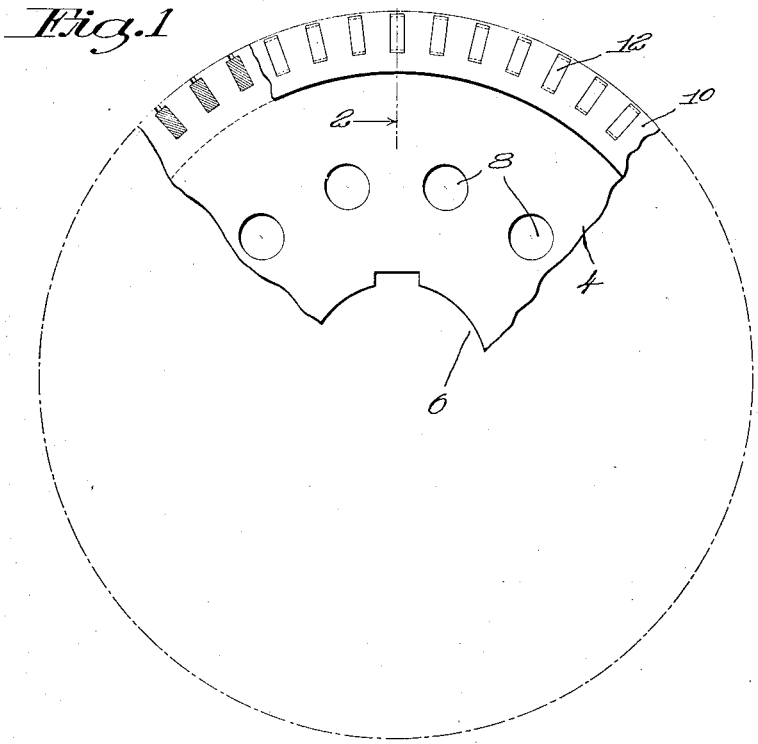
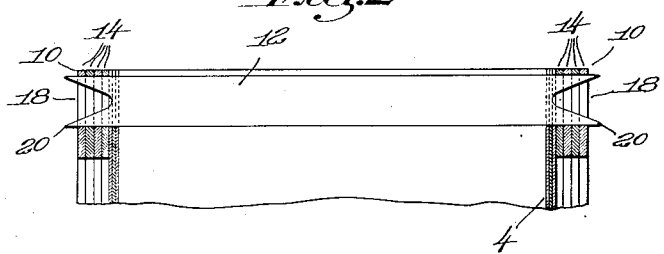
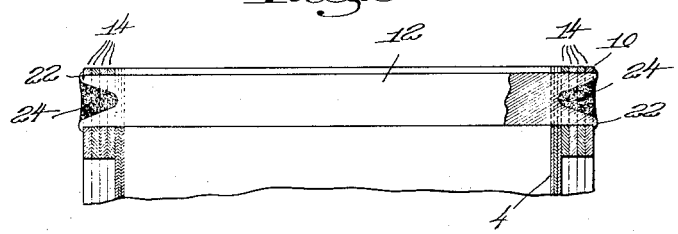

Patented Nov. 21, 1933

1,936,244

UNITED STATES PATENT OFFICE 1,936,244

LAMINATED CORE MEMBER AND METHOD OF MAKING THE SAME

Carl O. Bergstrom, Mattapan, Mass., assignor to B. F. Sturtevant Company, Hyde Park, Mass., a corporation of Massachusetts Application February 11, 1927. Serial No. 167,455

14 Claims. (Cl. 172—120)

The present invention relates to laminated magnetic cores and methods of making the same and is particularly adapted for use in connection with rotors for induction motors and their manufacture.

One of the objects of the present invention is to provide a rigid laminated core of high mechanical strength. Another object is to provide a squirrel cage rotor or analogous structure of strong and rigid construction and having good electrical connection between the separate conductors and the short circuiting members. A further object is to devise methods of inexpensively manufacturing such cores and rotors.

With these objects in view, the present invention consists in the laminated magnetic core member and rotor and in the method of making the same as hereinafter described and particularly defined in the claims.

In the accompanying drawings, illustrating the preferred form of the present invention as applied to a magnetic core member consisting of a squirrel cage rotor, Fig. 1 is an end elevation partly in section of such a rotor embodying the features of the present invention; Fig. 2 is a section on line 2—2 of Fig. 1, showing the rotor assembly in one stage of its manufacture; Fig. 3 is a sectional view similar to Fig. 2, showing the completed assembly; and Fig. 4 is a diagrammatic view showing the method of assembling the rotor.

The preferred form of the invention as applied to a squirrel cage rotor and its method of manufacture, is described as follows: The rotor comprises an iron core 4 built up of a series of laminations. The core has a central opening 6 for mounting on a hub, and is provided with the usual ventilating holes 8. At each end of the rotor is a short circuiting member 10, to which the conductors 12 are secured in good electrical contact. Each of the short circuiting members comprises one or more end rings 14 of copper or brass. The number of rings to be used depends upon the desired electrical resistance of the rotor, four of such rings being employed in the illustrated embodiment of the invention in order to produce a rotor of low resistance. The laminations of the core are formed with rectangular conductor slots to receive the copper conductors 12 which extend through rectangular openings of the end rings registering with the slots of the core. Each conductor consists of a long bar of considerable depth and relatively small thickness. Each end of the conductor is recessed to provide a V-shaped or angular notch 18, the apex of which extends inwardly beyond the innermost end ring. The formation of the angular notches provides triangular projections 20 which extend outwardly beyond the outer surfaces of the short circuiting members.

After setting up all of the conductors and end rings in the position shown in Fig. 2, the rotor is subject to operations which firmly bond the conductors mechanically to the end rings and ensure an excellent electrical connection between them. To this end, the rotor assembly, after being compressed or clamped axially, is placed in a press which simultaneously tips over or strikes down all of the triangular projections into the position shown at 22 in Fig. 3. As shown in Fig. 4, the press comprises a fixed head 21 and a movable rand 21' on which the rotor is carried. The outwardly flaring edges of the notched ends of the conductor determine the direction of tipping of the projections 20, so that they are accurately struck down against the outer surfaces of the short circuiting member by the axial force applied by the press. This result is brought about by the fact that under longitudinal pressure the inclined surfaces of the angular projections act as buttresses engaging with the press and thereby determine the direction of tipping or striking over of the protruding end of the bars. It will therefore be seen that the projecting ends will tip over away from the center line of the bar. The force with which the conductors are pressed into engagement with the short circuiting members provides a connection of sufficient mechanical strength to hold all parts of the rotor including the core laminations and the end rings, in rigid relation and in proper position without additional support.

When the invention is applied to a rotor, as in the illustrated embodiment, the conductors are preferably of a material, such as copper or aluminum, which is not only sufficiently malleable to insure firm engagement with the ends of the core member, but also possesses high electrical conductivity.

In order to form an incorrodible electrical connection between the conductors and end rings, the notches of the separate conductors are filled with a fusible material of good electrical conductivity. This connection, which forms the electrical contact between each conductor and each of the end rings, may be obtained by a soldering or a welding operation. If welded, the separate notches of the conductors are filled with a welding compound during the application of suitable welding electrodes. An equally good connection for all practical purposes, however, is obtained by soldering, and this manner of connection offers the advantage that all of the conductors at each end of the core may be simultaneously joined to the end rings, thus facilitating manufacture. To accomplish this result, the rotor being suitably carried by any desired means, first has one end dipped bodily into a flux bath to a sufficient depth to coat the notched portions of all the conductors thoroughly with the flux. This end is then immersed in a solder bath to approximately the same depth. The term "solder" as used herein, is not intended to be limited to the usual low melting alloy, but includes spelter and brazing compounds, preferably of a composition having a melting point not lower than 750° F., in order that heating of the rotor in normal use or even under excessive loads will not destroy the connection between the conductors and end rings by melting of the compound. After the solder is applied to one end, the rotor is inverted and similar operations of fluxing and soldering are performed on the other end. The solder fills in the angular notches of the conductors as indicated at 24, and because of the fact that the notch is sufficiently deep to extend inwardly beyond the innermost end ring, a satisfactory and permanent electrical connection of extremely low resistance is formed between each conductor and each of the end rings. By the provision of the open-sided V-shaped notches, all of the end rings are exposed to the solder. It is therefore not necessary to rely on the pressure of the striking over operation to give the necessary electrical connection. The solder, in addition to electrically connecting the parts, also seals the connections against attacks of a corrosive nature which might tend to impair the electrical contact or to loosen the mechanical connection.

It will be seen that this construction permits convenient and inexpensive assembly of a rotor. The mechanical action of striking over the ends of the conductors is performed simultaneously for the entire structure instead of requiring successive operations on the various conductors separately. The soldering operation is carried out with extreme facility, only two operations, namely, dipping in the flux and immersing in the solder bath, being required for each end of the rotor.

While the invention has been shown and described as embodied in a squirrel cage rotor, it is understood that the invention is not limited to such construction and arrangement but may be embodied in other types of core members employing a plurality of magnetic laminations.

The invention having been described, what is claimed is:

1. A squirrel cage rotor comprising a magnetic core, short circuiting members having conductor receiving openings, and a plurality of conductors extending through the openings of the short circuiting members, each conductor having an open sided fused metal receiving recess at each end interiorly adjacent to the short circuiting member, the recesses being filled with fused metal for electrically connecting the conductor with the short circuiting members.

2. A squirrel cage rotor comprising a magnetic core, short circuiting members consisting of a plurality of end rings at each end of the core, each end ring having a conductor receiving opening, and conductors extending through the openings of the end rings and provided with a V-shaped recess at each end extending inwardly beyond the innermost end ring, the recesses being filled with solder to connect each conductor electrically to each of the end rings.

3. A squirrel cage rotor comprising a magnetic core, short circuiting members consisting of a plurality of end rings having conductor receiving openings, conductors extending through the opening beyond the outer surfaces of the short circuiting members, each conductor having at each end a recess extending inwardly beyond the innermost end ring, the ends of the conductor being struck down against the outer surfaces of the end rings and the recesses being filled with solder to connect each conductor to each of the end rings.

4. A method of making a squirrel cage rotor which consists in assembling at each end of a magnetic core a plurality of end rings to form short circuiting members, the end rings having conductor receiving openings, inserting conductors into the openings to extend beyond the outer surfaces of the short circuiting members, each conductor having an angular recess at each end extending inwardly beyond the innermost end ring, simultaneously striking over the ends of all the conductors to engage with the short circuiting members, and connecting the conductors to all of the end rings by first dipping one end and then the other in a bath of flux and a bath of molten solder to fill the recesses of the conductors.

5. A method of making a magnetic core member which consists in assembling a plurality of laminations having registering openings, inserting in the openings malleable retaining devices each having angular recesses at opposite ends to form projections extending beyond the ends of the core member, and applying axial pressure to simultaneously strike the projections down against the ends of the core member, the direction of tipping of the projections away from the center line of the bar being determined by the inclined edges of the recesses.

6. A squirrel cage rotor comprising a magnetic core, short circuiting members having conductor receiving openings, each short circuiting member comprising a plurality of end rings, and a plurality of rectangular conductors extending through the core and the openings of the end rings, each conductor having an angular recess extending through its thickness at each end to provide spaced angular projections having their outer portions only protruding beyond the end rings, the projections being struck down against the end rings and the recesses being filled with fused metal for electrically connecting the conductors with each of the end rings.

7. A method of making a magnetic core member which consists in assembling a plurality of laminations having registering openings, inserting in the openings malleable bars, each bar having at the end an inclined edge, and applying axial pressure simultaneously to the ends of all of the bars to strike the projecting end down against the core member, the direction of tipping or striking of the projections away from the center line of the bar being determined by the inclined edges of the bars.

8. A squirrel cage rotor comprising a magnetic core having a plurality of laminations, short circuiting members having conductor receiving openings, and a plurality of rectangular conductors extending through the core and the short circuiting members, the conductors having at their ends inclined surfaces to form angular projections extending beyond the short circuiting members which projections are struck over away from the center line of the conductors under longitudinal pressure to hold the laminations under uniform high compression and also to provide interior recesses adjacent to the short circuiting members, the recesses being filled with fused metal for electrically connecting the conductors with the short circuiting members.

9. A method of making a squirrel cage rotor which consists in assembling a plurality of laminations to form a magnetic core, assembling a plurality of end rings to form short circuiting members, the end rings and laminations having conductor receiving openings, inserting conductors into the openings, each conductor having at each end an inclined surface to form an angular projection extending beyond the outermost end ring, and an angular recess extending inwardly beyond the innermost end ring, simultaneously pressing over the ends of all the conductors to engage with the short circuiting members, the direction of tipping of the angular projections being determined by the inclined edges of the conductors, and filling the angular recesses with fused metal to connect each conductor electrically to each of the end rings of the short circuiting members.

10. A squirrel cage rotor comprising a magnetic core having a plurality of laminations held under compression, short circuiting members having conductor receiving openings, and a plurality of conductors extending through the core and the short circuiting members, each conductor having inclined end surfaces at its ends to form angular projections extending beyond the short circuiting members, the projections being struck down by longitudinal pressure against the short circuiting members to maintain the core under compression, the inclined end surfaces determining the direction of tipping away from the center of the bar under pressure, and a body of fused metal filling the recess adjacent to the projecting portions of the conductors for electrically connecting the conductors with the short circuiting members.

11. A method of making a magnetic core member of a plurality of laminations and bars having angular projections with inclined surfaces at their ends which consists in assembling the laminations, inserting the bars through the laminations and applying axial pressure simultaneously to the ends of all of the bars to strike the projecting ends down against the core member, the direction of tipping or striking of the projections away from the center line of each bar being determined by the inclined edges of the projections.

12. A method of making a magnetic core member which consists in assembling a plurality of laminations having registering openings, inserting in the openings retaining bars having inclined end surfaces, and subjecting all of the bars simultaneously to longitudinal pressure to strike over the ends and thereby compress the laminations, whereby the laminations are retained in compressed condition by the bars, the direction of tipping of the ends of the bars away from the centers of the bars being determined by the inclined surfaces thereof.

13. A magnetic core member comprising a plurality of laminations having spaced registering openings and means for rigidly retaining the laminations together comprising a plurality of bars received in the openings and each having a V-shaped notch at its opposite ends to form angular outwardly tapering projections extending beyond the ends of the core, the ends of the projections engaging the ends of the core under uniform heavy pressure to thereby clamp all the laminations together.

14. A magnetic core member comprising a plurality of laminations having spaced registering openings and means for rigidly retaining the laminations together comprising a plurality of bars received in the openings and each having an open-sided, V-shaped notch at its end to form angular outwardly tapering projections extending beyond the end of the core with the bottom of the notch positioned within the core member, the ends of the projections engaging the end of the core under uniform heavy pressure and the sides of the tapering projections gripping the side walls of the opening to thereby clamp all the laminations together.

CARL O. BERGSTROM.